United States Patent [19]

Riley

[11] 3,776,431
[45] Dec. 4, 1973

[54] MATERIAL SPREADER SYSTEM WITH HYDRAULIC DRIVE AND SPEED CONTROL MEANS

[76] Inventor: John R. Riley, 7139 Sharpcrest, Houston, Tex. 77036

[22] Filed: Aug. 7, 1972

[21] Appl. No.: 278,680

[52] U.S. Cl.................... 222/178, 60/431, 239/677
[51] Int. Cl............................................ E01c 19/20
[58] Field of Search.................. 222/178; 239/677; 60/431; 137/344

[56] References Cited
UNITED STATES PATENTS

| | | | |
|---|---|---|---|
| 3,677,540 | 7/1972 | Weiss | 222/178 |
| 3,490,653 | 1/1970 | Raitch | 222/178 |
| 3,159,965 | 12/1964 | Woolleg | 60/431 |

Primary Examiner—Robert B. Reeves
Assistant Examiner—Thomas E. Kocovsky
Attorney—Michael P. Breston et al.

[57] ABSTRACT

This invention relates to material spreaders of the type including: a hopper, a prime mover for propelling the hopper at predetermined speeds, a movable unloading assembly for spreading the material from the hopper on the ground at a rate dependent upon the nature of the material and the ground speed of the hopper, a hydraulic motor for driving the unloading assembly, a hydraulic pump, and a control unit between the hydraulic pump and the hydraulic motor for varying the speed of the motor. The control unit employs a fluid-flow proportioning device connected in parallel-circuit relationship with an operable 3-way valve to provide at least two speeds for the motor.

4 Claims, 2 Drawing Figures

MATERIAL SPREADER SYSTEM WITH HYDRAULIC DRIVE AND SPEED CONTROL MEANS

BACKGROUND OF THE INVENTION

Various types of material spreaders are known and used. Such spreaders typically include: a hopper mounted on a truck chassis a conveyer positioned to receive the material from the hopper, and means for moving the conveyer at a linear speed which is proportional to the ground speed of the truck. The ground speed depends on the selected gear and, for trucks with two-speed axles, on the selected axle ratio. When maintaining the same gear, say second gear, the forward speed of the truck is varied by changing from one axle ratio to the other, which can be easily accomplished by manipulating an axle ratio control element.

It is desired that the conveyer's drive automatically correlate the speed of the conveyer with the speed of the truck so as to spread the material on the ground at a constant rate.

It is particularly desired for this correlation to be automatic, so that no human intervention is required to change the speed of the conveyer in reponse to a change in the axle ratio.

SUMMARY OF THE INVENTION

The above and other apparent objects are accomplished in a preferred embodiment of this invention by employing, in the hydraulically-powered drive of the conveyer, a 3-way valve in series circuit between the pump and the motor, and a fluid-flow-proportioning device in parallel with the 3-way valve. The 3-way valve is operable by means which are tied to the control means used to change the axle ratio. In this manner, whenever the axle ratio is changed, the 3-way valve will also be automatically operated. The 3-way valve can either by-pass the proportioning-device or it can allow it to function as a fluid divider.

The hydraulic motor will have a greater speed when the proportioning device is by-passed, and a reduced speed when the proportioning device is not by-passed.

In a similar manner, there can be beneficially employed another fluid-flow-proportioning device also connected in parallel with another 3-way valve. Such an additional combination will add two additional speeds for the hydraulic motor. In sum, for each fluid-proportioning device, two additional speeds are obtained for the hydraulic motor driving the conveyer.

DESCRIPTION OF THE SPREADER

Figure 1:
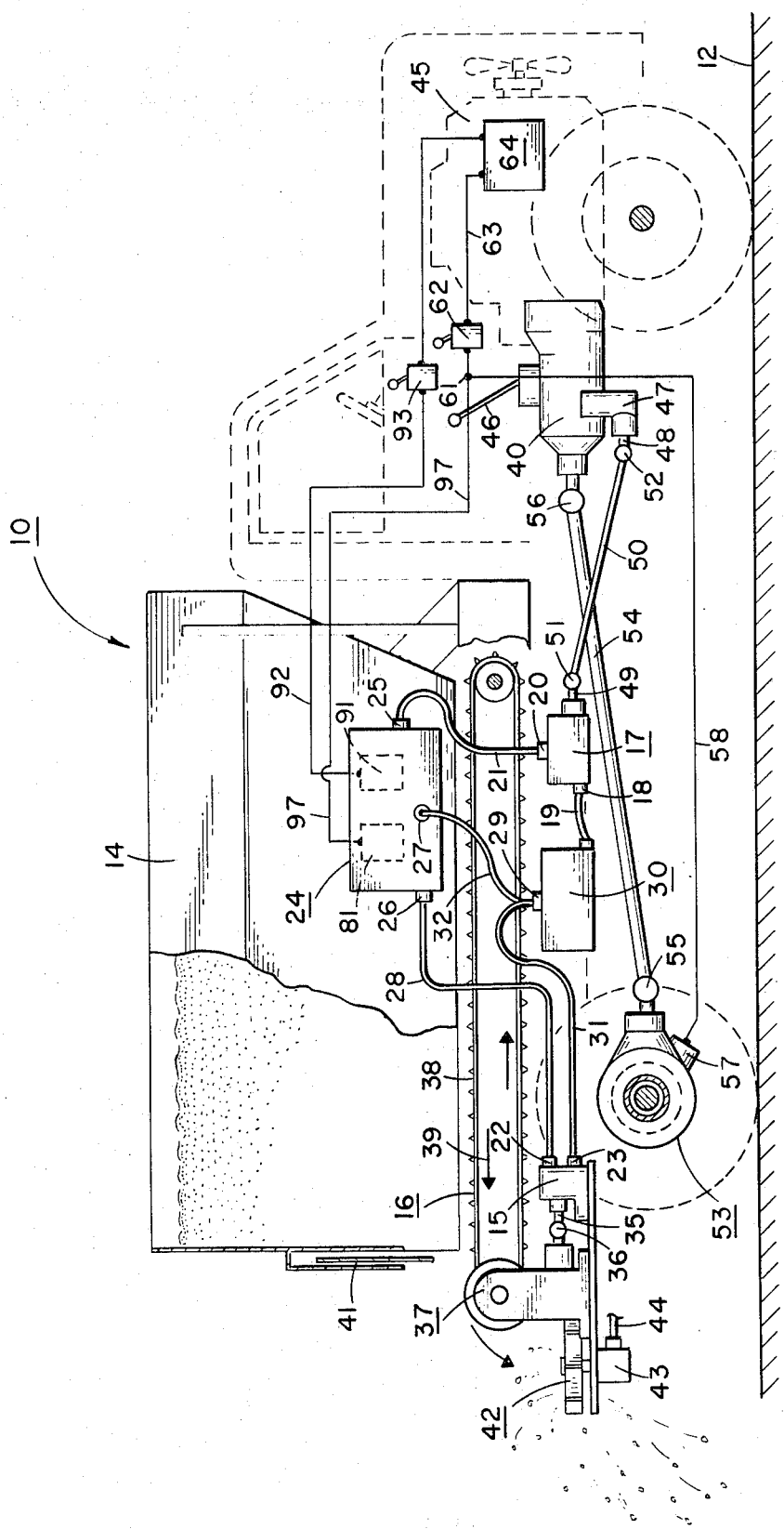
FIG. 1 is a schematic representation of a material spreader of this invention which automatically correlates the speed of the material unloading assembly with the axle ratio selector.

In FIG. 1, a self-propelled spreader vehicle 10 is shown movable over the earth's surface 12. On the chassis of vehicle 10 is provided a hopper 14 for storing therein a material for example, limestone or fertilizer. The unloading of the material from hopper 14 is accomplished by a movable assembly which is powered by a hydraulic motor 15.

In the preferred embodiment, the material-unloading assembly includes a conveyer assembly 16. It is powered by a hydraulic power generator system including a hydraulic pump 17 for feeding the hydraulic motor 15. Pump 17 receives at its inlet 18 a low-pressure fluid on line 19 and discharges its high-pressure fluid to its outlet 20 on high-pressure line 21. Both pump 17 and motor 15 are, preferably, of the constant-displacement type, wherein the volume of fluid displaced by each is proportional to the RPMs of their respective shafts.

Motor 15 has an inlet 22 and an outlet 23. The volume of fluid flowing into inlet 22 will be automatically controlled by a fluid-flow-controller, generally designated as 24, having a fluid inlet 25 and two fluid outlets 26 and 27. Generally, the hydraulic circuit is as follows: outlet 26 is coupled to inlet 22 via a fluid line 28; outlet 27 is coupled to inlet 29 of a fluid reservoir 30 via a line 32 and outlet 23 is coupled to inlet 27 via a fluid line 31.

Shaft 35 of motor 15 is coupled through a coupling device 36 to the conveyer's power train, generally designated as 37 and of conventional construction. In such conveyers there is a mobable member, typically a chain 38 which is movable in a linear direction as indicated by the arrow 39. The power train 37 has means (not shown) to change the speed of chain 38 to correspond with the selected gear in the gear box 40 of vehicle 10.

The material from hopper 14 is unloaded onto the movable chain 38 through an adjustable gate 41. From the chain, the material drops onto a fan spinner, generally designated as 42, of conventional construction. Unit 42 includes a gear box 43 driven by a drive shaft 44 which is coupled by suitable means (not shown).

Vehicle 10 includes a prime mover or engine 45 coupled to gear box 40 whose gear selector handle 46 allows for the selection of the desired gear. It is conventional for such gear boxes to provide a power take-off 47 having a shaft 48 whose RPM is determined by the selected gear in box 40. Shaft 40 is mechanically coupled to the input shaft 49 of the hydraulic pump 17 by a drive shaft 50 which is provided at its ends with universal joints 51 and 52, respectively.

The propulsion of vehicle 10 is accomplished by connecting the gear box 40 with the rear axle drive unit, generally designated as 53, through a drive shaft 54 having at its ends universal joints 55, 56, respectively. It is also conventional on such vehicles for the axle drive unit 53 to have two distinct axle ratios, typically 6:8 and 7:9. The selection of a particular axle ratio is accomplished by a shifting means 57 which could be vacuum operated, mechanically controlled, etc. In the preferred embodiment shifting means 57 is electrically operated through a line 58 leading from a terminal 61 of a manually-operated switch 62 whose other terminal is connected via line 63 to the battery 64. Switch 62 will establish galvanic continuity between the battery 64 and line 58 only when gear box 40 is in gear. Switch 62 is conveniently positioned near the gear-shift selector 46.

GENERAL DESCRIPTION OF CONTROL UNIT 24

Figure 2:
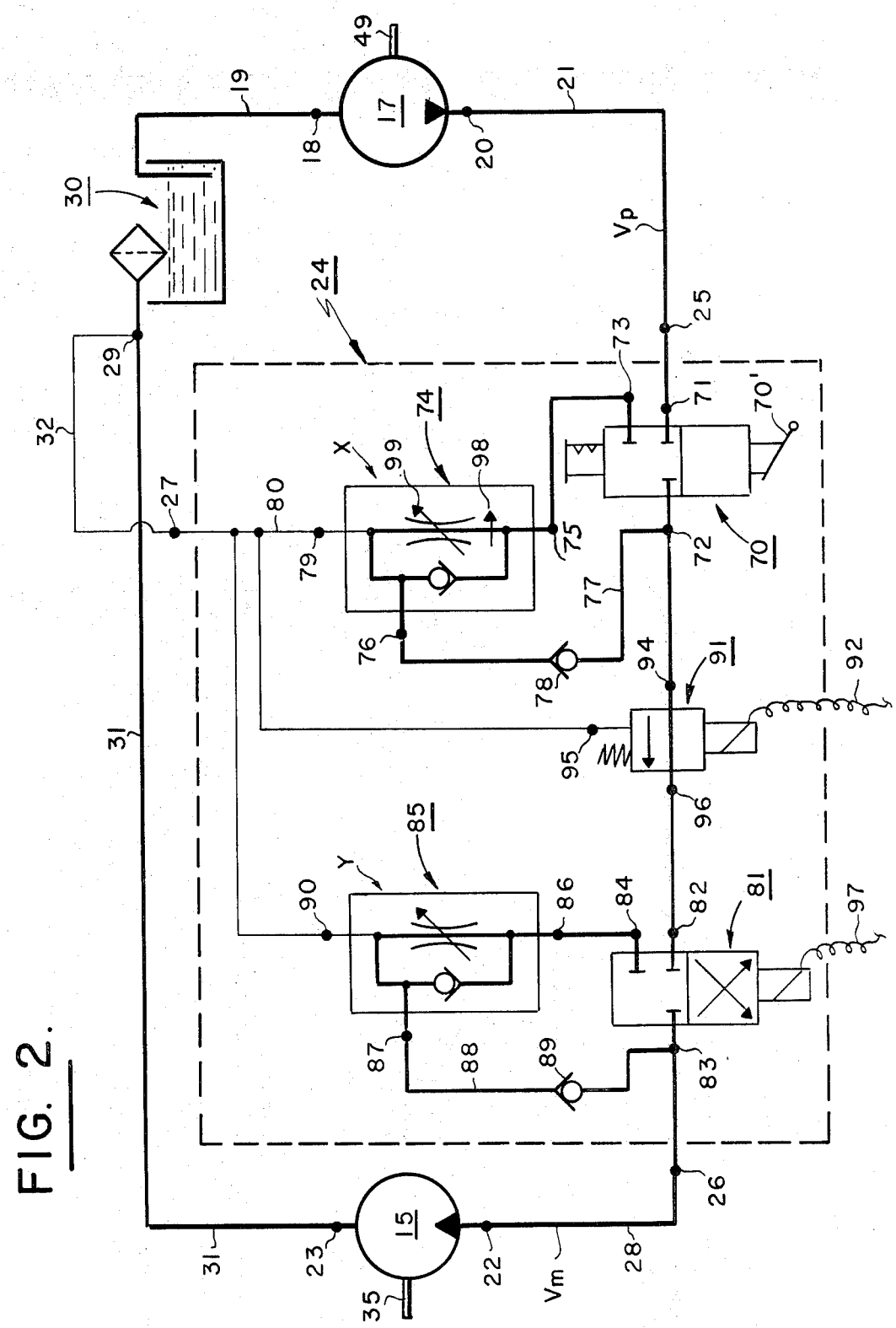
FIG. 2 is a hydraulic circuit diagram of the hydraulic control unit used in FIG. 1.

Referring now more specifically to FIG. 2, wherein the same numerals are used to designate the same parts, it is desired, as previously mentioned, for simplicity and economy of operation that pump 17 and motor 15 be of the fixed-displacement type, that is, the rate of fluid displaced by pump 17 shall be proportional to the RPM of its shaft 49, and the RPM of shaft 35 shall be proportional to the rate of fluid flowing through the motor's inlet 22. Accordingly, it is the main function of control unit 24 to selectively change the ratio between the volume $V_p$ flowing out of pump 17 and the volume $V_m$ flowing into motor 15. The control unit 24 will allow for ratio $V_m/V_p$ to have predetermined, discrete values depending upon the nature of the material in hopper 14 and the particular axle ratio selected by selector 57.

DETAILED DESCRIPTION OF CONTROL UNIT 24

One ratio for $V_m/V_p$ is achieved by providing a 3-way valve 70 which may be a manually-operated valve having an inlet 71 and two outlets 72, 73. Connected in parallel-circuit relationship with valve 70 is a fluid-flow-proportioning device having a proportionality constant X, generally designated as 74, whose inlet 75 is connected to the outlet 73, and one of its outlets 76 is connected to outlet 72 through a line 77 and a check valve 78. Its other outlet 79 is connected to the return, low-pressure line 31 through a line 80.

To obtain another ratio for $V_m/V_p$ there is provided another 3-way valve 81 having an inlet 82 and two outlets 83 and 84. Connected in parallel with valve 81 is another fluid-flow-proportioning device 85, having a proportionality constant Y, whose inlet 86 is connected to outlet 84, and one of its outlets 87 is connected to outlet 83 through a line 88 and a check valve 89. Its other outlet 90 is connected to the return line 80.

To couple and de-couple the fluid-flow-porportioning devices 74 and 85, there is provided a suitable pilot valve 91 which is, preferbly, electrically operated. Other modes of operation for valve 91 could be used. Valve 91 can be a solenoid valve operated through a line 92 connected to the battery 64 through a switch 93 (FIG. 1). The inlet 94 of valve 91 is connected to outlet 72. The outlets 95, 96 of valve 91 are connected to the return line 80 and to inlet 82, respectively.

Since the proportioning or fluid-divider device 74 is used dependent upon the material used in hopper 14, which is not frequently changed, valve 70 may be manually operated by a handle 70'. Conversely, since fluid divider 85 is used dependent upon the particular axle ratio selected by selector 57, which may change many times in a relatively short time span, it is convenient for valve 81 to be electrically operated. It can be a solenoid valve controlled by a line 97 also connected to terminal 61. Accordingly, line 97 will be electrically energized whenever line 58 is energized by switch 62. In other words, the manipulation of switch 62 will select the desired axle ratio. Such selection will also automatically determine the flow condition in the 3-way valve 81 and, hence, the value of ratio $V_m/V_p$.

The fluid-flow-proportioning devices 74 and 85 are commercially available and may be purchased, for example, from the Gresen Manufacturing Company. They come in various proportioning ratios, including X and Y. They are pressure compensated as represented by the arrow 98. The arrow 99 designates that the fluid flowing into, say inlet 75, is divided in accordance with the fixed ratio X between its outlets 76 and 79. The dividers 74 and 85 are similar in their internal construction, as is well known to those skilled in the art. This invention is therefore not limited to any particular type of fluid-flow-proportioning device, and while it is preferred to employ such devices having fixed ratios, similar devices with adjustable ratios could equally be employed, if higher cost and greater complexity are not too objectionable.

OPERATION OF THE SPREADER

In operation, hopper 14 will be loaded with a suitable material, such as limestone, fertilizer, etc.

Lime Operation, $V_m/V_p = 1$     (A)

Assume that hopper 14 is loaded with lime and that it is desired that the ratio $V_m/V_p = 1$ for the high axle ratio. Vehicle 10 will be propelled forward on ground 12 typically by moving gear shift handle 46 into second gear. The manipulation of switch 62 will actuate selector 57 to give the desired axle ratio, in a conventional, well-known manner. If the driver selects the high axle ratio, thereby causing vehicle 10 to move at a relatively-faster, ground speed, it will be necessary for chain 38 of conveyer 16 to also move at a corresponding relatively-high, linear velocity. In this manner, the lime may be spread by spreader 42 at a faster rate.

After the driver loads hopper 14 with lime he will move handle 70' of valve 70 to its lime position which will allow fulid to flow directly between inlet 71 and outlet 72, thereby by-passing divider 74. If pilot valve 91 is not energized, then 72, 94 and 95 will be in fluid communication, and no fluid will reach outlet 96. If pilot valve 91 is energized by switch 93, there will be established direct fluid communication between inlet 94 and outlet 96, as shown in FIG. 2.

When the high-axle ratio is selected, line 97 is denergized and direct fluid communication is established between inlet 82 and outlet 83. Accordingly, since no fluid is bled off by any of the valves 70, 91 and 81, $V_m = V_p$ and hence $V_m/V_p = 1$.

Lime Operation, $V_m/V_p = Y$     (B)

When the low axle ratio is selected, line 97 is energized, and fluid flowing into inlet 82 flows out through outlet 84 into the proportioning device 85 which feeds back to outlet 83 a portion $YV_p$, and the remainder portion flows out through outlet 90, return line 80, return line 31, and back into reservoir 30. Hence, $V_m/V_p$ is equal to the ratio Y established by the fluid-flow-proportioning device 85, hence $V_m/V_p = Y$.

It will be appreciated that the shifting between $V_m/V_p = 1$ and $V_m/V_p = Y$ is automatically accomplished without human intervention.

It will also be noted that when it is desired for the ratio $V_m/V_p = 0$, that is, for the conveyer's drive train 37 to be de-energized, all that is necessary is to de-energize line 92 of pilot valve 91 and the entire fluid $V_p$ will flow from inlet 94 to outlet 95 and back to return line 80. As previously mentioned, in the lime mode of operation, the fluid-proportioning device 74 was rendered ineffective by valve 70.

Fertilizer Operation, $V_m/V_p = X$     (C)

In the fertilizer mode, the operator loads hopper 14 with fertilizer and moves handle 70' to its fertilizer position, thereby breaking communication between inlet 71 and outlet 72 and establishing fluid communication between inlet 71 and outlet 73. The fluid-flow-proportioning device 74 will divert a portion of the fluid flowing therethrough to the return line 80 and will return the remainder portion $XV_p$ through line 76 to outlet 72 of valve 70. If the fluid-flow-proportioning device 85 is by-passed, then $V_m = XV_p$.

$$\text{Fertilizer Operation, } V_m/V_p = XY \tag{D}$$

If device 85 is not by-passed then $V_m = XYV_p$. Again, device 85 will become effective or ineffective in dependence upon the axle ratio selected by selector 57 through switch 62, and $V_m/V_p$ will correspondingly switch between the values X and XY.

In accordance with the above description, it is apparent that with two dividers the ratio $V_m/V_p$ can be made equal to 0, X, Y, XY, or 1, and that the control unit 24 may include only one fluid-flow-proportioning device 85, if it is contemplated to use spreader 10 for lime only, or three or more such devices, if it is contemplated to spread three or more materials at three or more different spreading rates.

It will also be appreciated that the rotation of shaft 49 and, hence, the value of $V_p$ is determined by the driving gear selected, typically the second gear. Should it be necessary or desirable to drive vehicle 10 in the first or third gear, an internal adjustment in the power train 37 of the conveyer 16 will be required to compensate for the gear change in a manner which will be obvious to those skilled in the art.

It will therefore be obvious that many other modifications may be made in the apparatus particularly disclosed herein. The invention is therefore not to be considered limited to the preferred embodiments shown in the drawings, but rather only by the scope of the appended claims.

What is claimed is:

1. A material spreader comprising:
   a hopper mounted on a chasis,
   at least one axle for supporting said chasis,
   at least one pair of wheels rotatably mounted on said axle;
   transmission means including an axle ratio selector for setting the ratio of said axle thereby controlling the speed of hopper propulsion over the earth's surface;
   a movable unloading assembly positioned under said hopper for receiving a material from said hopper and for spreading it on the ground;
   a hydraulic motor coupled to said unloading assembly for driving it at a speed proportional to the speed of the motor's shaft;
   a hydraulic pump having a shaft mechanically coupled to said transmission means for feeding fluid to said motor from a reservoir;
   said pump and said motor each being of the constant volume displacement type wherein the volume of fluid displaced is proportional to the angular speed of rotation of the shaft;
   a hydraulic control unit coupled between said pump and said motor, said unit comprising:
      a first 3-way valve in series circuit between said pump and said motor;
      a first fluid-flow proportioning device in parallel circuit with said first valve, said valve being automatically and solely operable by said axle ratio selector thereby changing the ratio $V_m/V_p$ between the volume $V_p$ delivered by said pump and the volume $V_m$ received by said motor, independence upon the setting of said axle ratio selector whereby the speed of the material-unloading assembly is automatically correlated with the speed of said axle.

2. The spreader of claim 1 wherein said control unit further includes: a second 3-way valve in series circuit with said first 3-way valve;
   a second fluid proportioning device connected in parallel circuit relationship with said first valve between said first and second valves; and
   means for operating said second valve to thereby change from one predetermined volumetric ratio to another predetermined ratio of fluid delivered by said pump to said first valve.

3. The spreader of claim 1 wherein:
   said axle ratio selector is electrically-operated, and said first valve is electrically-operated simultaneously with the operation of said axle ratio selector.

4. The spreader of claim 3 and further including:
   a pilot valve coupled between said first and second valves, said pilot valve being electrically-operated.

\* \* \* \* \*